Patented Mar. 12, 1929.

1,705,100

UNITED STATES PATENT OFFICE.

LUTHER E. SMITH, OF SHELBURNE FALLS, MASSACHUSETTS.

BORER'S GUM.

No Drawing.  Application filed April 24, 1926.  Serial No. 104,436.

This invention relates to improvements in borer's gum.

An object of the invention is to produce a plastic composition for fruit trees which is designed to be applied as a gum or coating to the base portion of the trunk of the young fruit trees for the purpose of preventing the borer from gaining access to the interior of the tree, after it has been hatched near the surface of the ground around the tree. It has been found that by applying this composition around the base part of the tree that the borer can not enter the tree.

A further object is to provide a gum that may also be used to heal a tree where the bark and portions of the wood have been eaten by the mice since this gum adheres tightly to the outer surface of the tree and is air and water tight. By covering the eaten places with gum material, new wood will be formed which heals and restores the parts that have been eaten away.

The composition consists in general of a mixture of rosin, beeswax, "Lenox" soap, and pine tar. The proportions of the ingredients are substantially as follows: 12 pounds rosin, 1½ pounds beeswax, 1½ pounds "Lenox" soap, and 1 quart pine tar. The ingredient "Lenox" soap is a well known laundry soap made by the firm of Procter & Gamble, the general analysis of which is, real soap 56.7%, sodium carbonate 2.62%, sodium silicate 3.34%, free $Na_2O$ .02%, salt (NaCl) .10%, glycerine .12%, unsaponifiable 1.3%, which consists of sterols from fat .2%, hydrocarbon from the fat .3%, non acidic resin from the rosin .8%, moisture 35.8%.

These ingredients are preferably heated and boiled to a suitable consistency so that the composition of matter when cooled may be readily applied as a plastic material, to the base of the tree for the purpose intended.

It is to be understood that satisfactory results may be obtained if the proportions mentioned of the ingredients are varied slightly. The composition is impervious to water, adheres to the surface without cracking, and is air tight.

What I claim is:

1. A plastic composition for the purpose described, which is impervious to air and moisture, and comprising a resinous material, beeswax, soap, and pine tar for binding substance.

2. A plastic composition of matter consisting of 12 pounds of resinous material, 1½ pounds beeswax, 1½ pounds "Lenox" soap, and 1 quart of pine tar substance.

3. A plastic composition of matter consisting of 12 pounds of resinous substance, 1½ pounds of beeswax, 1½ pounds "Lenox" soap and pine tar.

LUTHER E. SMITH.